United States Patent [19]
Perego

[11] Patent Number: 5,993,592
[45] Date of Patent: Nov. 30, 1999

[54] APPARATUS AND METHOD FOR GLUING DISC HALVES TOGETHER DURING MANUFACTURING OF DATA-STORAGE OPTICAL DISCS

[75] Inventor: Luciano Perego, Milan, Italy

[73] Assignee: Tapematic U.S.A. Inc., Orlando, Fla.

[21] Appl. No.: 08/996,493

[22] Filed: Dec. 23, 1997

[30] Foreign Application Priority Data

Mar. 17, 1997 [EP] European Pat. Off. .............. 97830121

[51] Int. Cl.⁶ .............................. B32B 31/00; G11B 3/70
[52] U.S. Cl. ........................... 156/292; 156/60; 156/578; 427/230; 369/286; 428/65.2
[58] Field of Search .............................. 156/60, 292, 285, 156/295, 578, 275.5, 275.7; 427/275, 230, 231; 118/44, 56; 369/280, 286; 428/64.4, 65.2

[56] References Cited

U.S. PATENT DOCUMENTS

| | | | |
|---|---|---|---|
| 5,284,538 | 2/1994 | Suzuki et al. ....................... | 156/292 X |
| 5,318,653 | 6/1994 | Toide et al. ............................... | 156/295 |
| 5,744,193 | 4/1998 | Kitano ...................................... | 427/162 |
| 5,800,670 | 9/1998 | Kitano ...................................... | 156/578 |
| 5,882,555 | 3/1999 | Rohde et al. ........................ | 369/280 X |

*Primary Examiner*—Michael W. Ball
*Assistant Examiner*—Shawn A. Mitchell
*Attorney, Agent, or Firm*—Frommer Lawrence & Haug LLP

[57] ABSTRACT

An apparatus and method for gluing disc halves together during manufacturing of data storage optical discs including a main support on which a first disc half is arranged in an elastic-deformation condition. A second disc half, optionally resiliently deformed to a conical configuration, is arranged under an auxiliary support axially opposed to the main support. An adhesive dispenser delivers an adhesive along the outer circumferential edge of the first disc half, following a rotation imparted to the dispenser about the respective axis. The dispensed adhesive spreads by gravity along the glued surface of the first disc half and is thereby evenly spread thereon. The second disc half is then lowered onto the first disc half to achieve mutual pairing of the first and second disc halves.

23 Claims, 4 Drawing Sheets

APPARATUS AND METHOD FOR GLUING DISC HALVES TOGETHER DURING MANUFACTURING OF DATA-STORAGE OPTICAL DISCS

FIELD OF THE INVENTION

The present invention relates to an apparatus and method for gluing disc halves together during the manufacturing of data-storage optical discs and related method therefor. The apparatus for gluing disc halves together of the present invention more particularly comprises a main support arranged to receive a first disc half thereon which has a surface thereof intended for gluing exposed in an opposite direction to the main support; an auxiliary support which is movable relative to the main support between a remote position, wherein the auxiliary support is moved away from the main support into a position for receiving and engaging a second disc half, and a work position, wherein the auxiliary support operates on the main support to mate the second disc half with the first disc half, and an adhesive-dispensing member for distributing an adhesive or glue between the first and second disc halves.

BACKGROUND OF THE INVENTION

It is known that data-storage optical discs, of the type commercially available under the abbreviation "DVD", ("Digital Video Disc") consist, as regards their structure, of two disc halves each of an approximate 0.6 mm thickness, glued together.

Presently there are different types of "DVD" and, depending on their storage capacity, they are differentiated by abbreviations "DVD5", "DVD9", and "DVD10". "DVD5" consists of a first disc half on which data read by an appropriate laser head is recorded and of a second stiffening disc half. Unlike "DVD5", a "DVD10" is made from two disc halves which already contain data. Data in the second optical disc of a "DVD10" is read by two heads, one located close to one disc face and the other located adjacent to the opposite face. Similarly, "DVD9" is made from two disc halves already containing data but, unlike "DVD10", data is read by means of two laser heads placed at the same surface of the optical disc.

Currently, various processes are used for performing gluing operations in order to achieve finished disks. According to one such current process, an adhesive is spread over the surfaces of the two disc halves which are brought into contact with each other by a roller assembly. More particularly, the disc halves are passed beneath rollers on which an adhesive has been previously distributed so that an even amount of glue is spread over the entire surface to be glued. Subsequently, the two disc halves with the glue distributed thereonto are removed and their glue-wet surfaces are brought into mutual contact so as to thereby obtain a single disc. This disc is then sent to a press where evenness of the glue spread is improved and an efficient gluing is ensured. The disc is then brought to a drying station, generally operating by means of an UV-ray lamp, for drying the glue.

However, this current process described above has been found to be rather complicated when it is incorporated in an automatic production cycle. In the practice of this process, if the two disc halves are ready to be simultaneously joined together, i.e., with glue spread thereon at the same time, two work stations are required to accomplish the rolling operation. From a cost effective standpoint, increased costs are associated with the purchase and maintenance of two identical work stations. Moreover, the apparatus is required to be much more bulky in terms of size and space requirements. In addition, the use of a single inlet station for the rolling operation approximately doubles the time for the gluing step.

In order to overcome the above drawbacks in the automatic production cycle, a further gluing process is also known, in which the two disc halves are moved adjacent to each other and engaged by suction cups or similar means that achieve elastic deformation of the disc halves retaining their central areas in mutual contact and their outer peripheral edges mutually separated from each other. While the disc halves are so arranged, a nozzle of a glue-dispensing device is inserted into the gap created between the disc halves. During this step, the device rotates the two disc halves to turn at least one complete rotation during which glue is released into the central areas of the disc halves. The nozzle is then withdrawn and the two disc halves are released by the suction cups or like means, so that the disc halves resume a flat configuration, thereby achieving glue distribution by capillary action over the entire surface of the disc halves in mutual contact. Optionally, it is possible to rotate the two paired disc halves so that the centrifugal force enables a complete glue spreading.

While this type of technique overcomes some of the inconveniences of the preceding technique, certain drawbacks of this device are also apparent. Foremost, in performing gluing by this process, a certain amount of the distributed glue may escape from the outer peripheral edges of the two disc halves which creates certain problems. As a first consequence o:f the above, a further work station in the optical-disc production cycle becomes necessary in order to eliminate the dried glue present outwardly of the parametric edge of the finished disc, for example, a grinding operation. A further drawback is due to the fact that the volume of glue interposed between the two disc halves cannot be accurately measured.

Moreover, for proper gluing, a glue amount: of about 0.5 ml is used, so as to obtain a nominal thickness of about 50 microns. Therefore, if part of the glue escapes from the discs, it is readily apparent that achieving a precise glue amount and thickness when dealing with such small amounts becomes practically impossible.

OBJECTS OF THE INVENTION

Therefore, it is an object of the present invention to provide an apparatus and process for gluing disc halves together which overcomes the above-described deficiencies of the prior art.

It is also an object of the present invention to provide an apparatus and process for gluing disc halves together which is suitable for automated assembly processes.

It is a further object of the present invention to provide an apparatus and process for gluing disc halves together which is of a reduced bulkiness in terms of size and space requirements.

It is yet another object of the present invention to provide an apparatus and process for gluing disc halves together which eliminates distribution of glue outwardly of the outer peripheral edges of the disc halves and corresponding need to element such unwanted glue.

A still yet further object of the present invention is to provide an apparatus and process for gluing disc halves together wherein the volume of glue interposed between the disc halves can be accurately measured.

Various, other objects, features and advantages of the present invention will become readily apparent from t:he ensuing detailed description and the novel features will be particularly pointed out in the appended claims.

SUMMARY OF THE INVENTION

The foregoing and further objects of the present invention are substantially achieved by an apparatus and process for gluing disc halves together during the manufacture of data-storage optical discs. The apparatus and method of the present invention includes an elastic-deformation device associated with a main support and operating on the first disc half to deform the first disc half such that its outer circumferential edge is raised relative to its central portion. An adhesives-dispensing mechanism distributes glue at least close to the outer circumferential edge of the first disc half in its deformed condition, thereby permitting the glue to be distributed by gravity along the surface intended for gluing.

In accordance with the teachings of the present invention, a method for gluing disc halves together in the manufacture of data-storage optical discs is also provided. In this method, the first disc half is arranged so that one of its surfaces intended for gluing is turned upwardly. The first disc half is resiliently deformed while retaining its outer circumferential edge raised relative to a central portion thereof. Next, an adhesive is spread at least on the outer circumferential edge of the first disc half. The adhesive is permitted by gravity to be distributed along and throughout the surface intended for gluing. The first disc half is then mated with a second disc half bringing one face of the second disc half into contact with the surface intended for gluing of the first disc half to thereby joining the disc halves together.

BRIEF DESCRIPTION OF THE DRAWINGS

The following detailed description, given by way of example, will best be understood in accordance with the accompanying drawings in which.

DETAILED DESCRIPTION OF CERTAIN PREFERRED EMBODIMENTS

Figure 1:
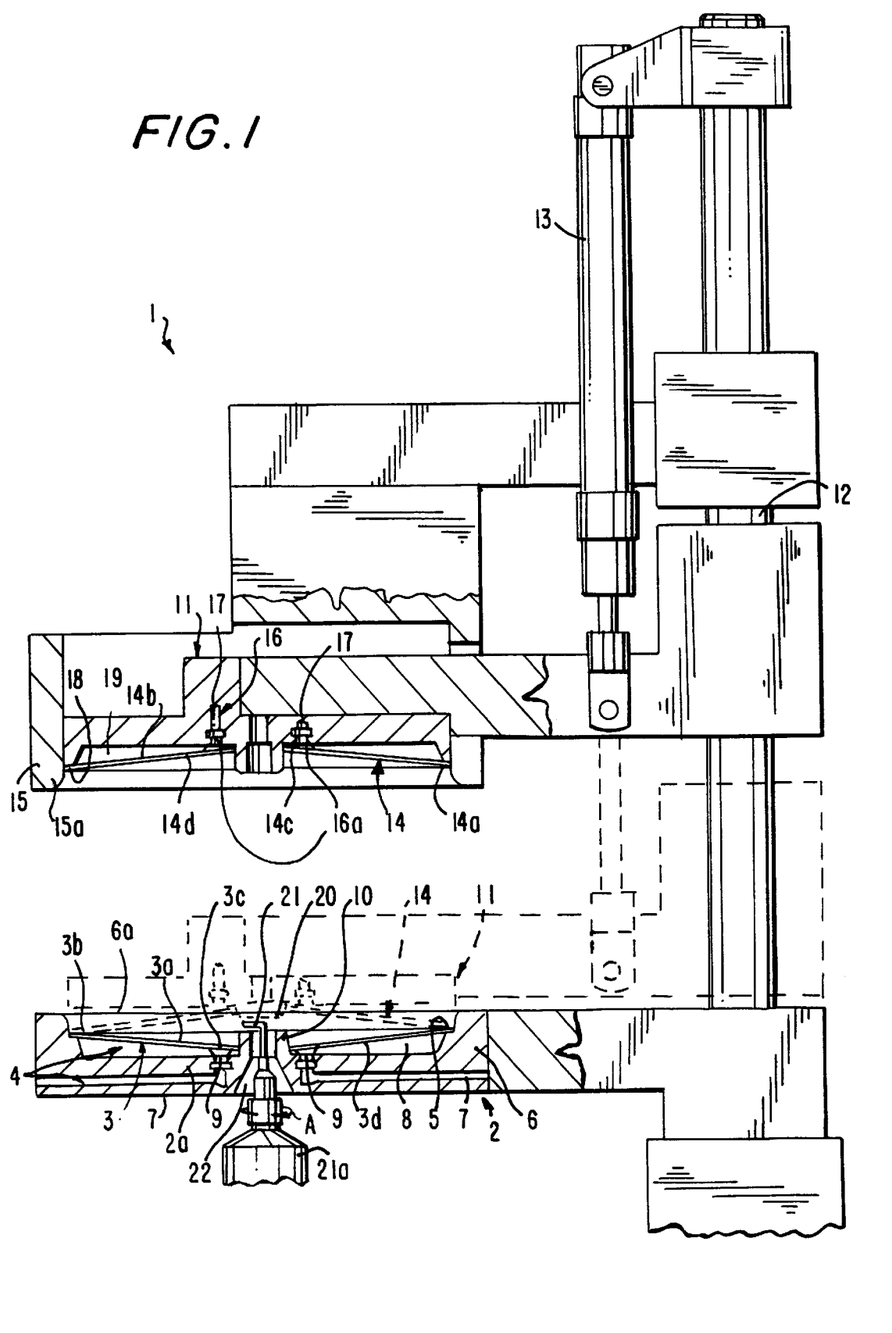
FIG. 1 is an elevational view partly in section of a preferred embodiment of an apparatus for gluing disc halves together during manufacture of data-storage optical discs in accordance with the teachings of the present invention.

Referring now to the drawings, wherein like reference numerals are used throughout and in particular to FIG. 1, a device and method for gluing disc halves together during manufacturing of data-storage optical discs in accordance with the teachings of the present invention has been generally identified by reference numeral 1.

Figure 4:
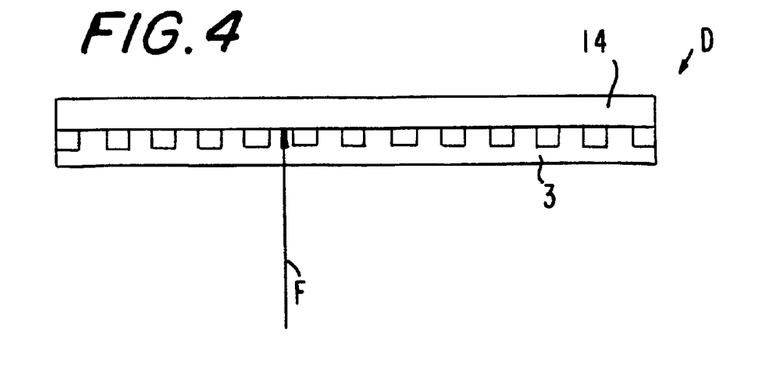
FIG. 4 diagrammatically shows the structure and operating principle of an optical disc of the "DVD5" type.
Figure 5:
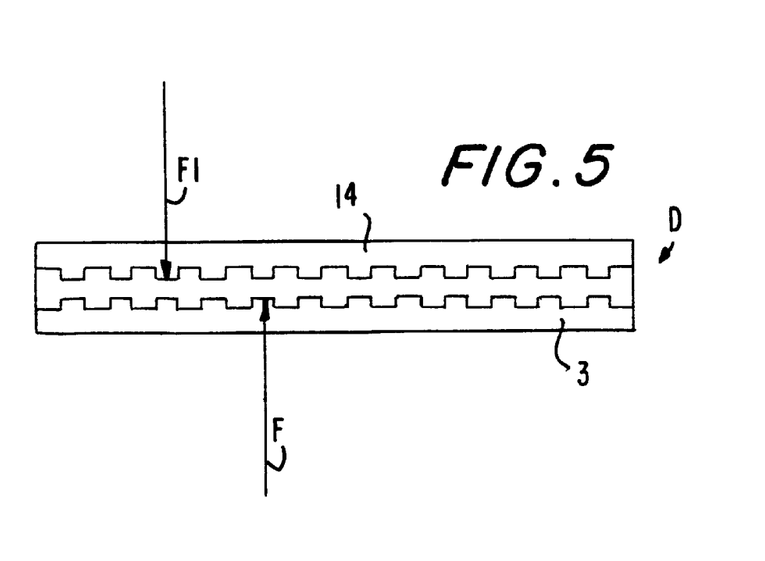
FIG. 5 diagrammatically shows the structure and operating principle of an optical disc of the "DVD10" type.
Figure 6:
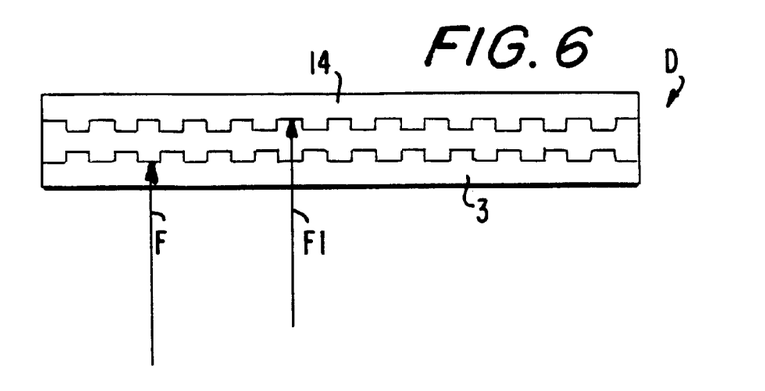
FIG. 6 diagrammatically shows the structure and operating principle of an optical disc of the "DVD9" type.

For purposes of illustration and clarity, FIGS. 4, 5 and 6 have been provided to illustrate three different kinds of "DVD" discs that can be obtained by the process of the apparatus according to the present invention. More particularly, as is shown in FIG. 4, an optical disc D of the "DVD5" type is illustrated which includes a first disc half 3 on which data is recorded and a second disc half 14 applied to the first disc half 3 for protection of the recorded data. The recorded data can be read by a laser head, represented by arrow F in FIG. 4 and operating on the side of the first disc half 3.

As aforementioned, FIG. 5 illustrates an optical disc of the "DVD10"type. In a "DVD10" type optical disc, two disc halves 3, 14 both carry recorded data. The recorded data on either disc half 3, 14 can be read by respective playback heads F and F1 disposed on opposite sides respectively relative to disc D.

FIG. 6 illustrates an optical disc of the "DVD9" type wherein similar to the "DVD10" type disc, both disc halves 3, 14 carry recorded data. In contrast to the "DVD10" type disc, the recorded data can be read by two respective playback heads F, F1 both disposed on the same side of disc D, as shown in FIG. 6.

In the apparatus for gluing disc halves together of the present invention, as is shown in FIG. 1, a main support 2 is arranged to receive and support thereon a first disc half 3 which has a surface intended for gluing 3a turned upwardly, in the opposite direction to the main support 2. The main support 2 includes an elastic-deformation assembly 4 for disposing the first disc half 3 in a resiliently deformed condition wherein the first disc half has an outer circumferential edge 3b thereof raised relative to its central portion 3c, as is clearly shown in FIGS. 1 to 3.

In order to accomplish this result, as shown in FIG. 7, the elastic-deformation assembly 4 may include a rest portion 5 formed on a side wall 6 of the main support 2 and shaped as to act on the outer circumferential edge 3b of the first disc half 3. This elastic-deformation assembly cooperates and interacts with holding assembly 7, 8, 9 operating on the first disc half to lower the central position 3c thereof so as to bring it to its deformed condition from a rest condition in which it is substantially planar.

The holding assembly 7, 8, 9 can optionally be of a mechanical type. However, in a preferred embodiment of the present invention, the holding assembly includes one or more suction ducts 7 connected to a vacuum pump (not shown) and opening, through the main support 2, into a vacuum chamber 8 defined between the main support 2 and a lower surface 3d of the first disc half 3. The parametric edge 3b of the lower surface of the first disc half 3 is located on the rest portion 5. The sucking action thereby produced by the suction ducts 7 and the consequent vacuum created in chamber 8 causes elastic deformation of the first disc half 3 that will substantially take the form of an inverted cone.

Alternatively, the elastic deformation of the first disc half 3 from its rest condition to a resiliently deformed condition can be achieved by an axial thrust action performed on the disc half. This axial thrust action can be achieved by means of a handling device (not shown) which is intended for automatic loading of the disc half 3 onto the main support 2. During this loading step, a correct and precise centering of the first disc half 3 may be enhanced by arranging, at the end of the side wall 6 and next to the rest portion 5, at least one parametric centering projection 6a, the shape of which substantially matches that of the disc half. One or more suction cups 9 associated at their ends with the suction ducts 7 operate close to the lower surface 3d of the first disc half 3 to conveniently hold it in its deformed condition.

Upon reaching the elastic-deformation condition, the first disc half 3 has its central portion 3c in contact with one or more inner rest elements that can be embodied by the suction cups 9, for example. In addition to, or in place of the suction cups 9, the inner rest elements may be in the form of mechanical abutment shoulders, for instance, formed on a base wall 2a or a central hub 10 carried by the main support 2 for fitting of a central hole usually provided in the first disc half 3.

The apparatus and method of the present invention further includes an auxiliary support 11 preferably mounted on a guide structure 12 integral with the main support 2, at an opposite position relative to the main support. Upon the action of a fluid-operated actuator 13 or equivalent means, the auxiliary support 11 is movable relative to the main support 2 between a standby position, wherein the auxiliary support 11 is moved away from the main support, as shown by solid line, to receive and engage a second disc half 14, and a work position wherein as shown by chain line in FIG. 1, the auxiliary support 11 acts on the main support 2 to mate the second disc half 14 with the first disc half 3, as better clarified in the following description. In the work position, the auxiliary support 11 is advantageously engaged with the parametric projection 6a of the main support 2, so as to ensure a accurate centering of the second disc half 14 relative to the first disc half 3.

Positioning of the second disc half 14 under the auxiliary support 11 can be carried out for example by a mechanical handling device. In order to promote centering of the second disc half 14 during engagement with the auxiliary support 11, use of an outer jacket 15 is provided which is rigidly fixed relative to the guide structure 12.

When the auxiliary support 11 is at its standby position, the outer jacket 15 surrounds the auxiliary support 11 slightly projecting from a lower edge thereof, so as to define at least one auxiliary projection 15a. The shape of the projection 15 substantially matches that of the second disc half 14 and is substantially similar to the parametric projection 6a defined by the side wall 6 of the main support 2.

When the auxiliary support 11 is moved away from its standby position, the auxiliary support 11 is released from the outer jacket 15 so that, upon reaching the work position, the auxiliary support 11 can be axially fitted in the parametric projection 6a of the main support 2 thereby bringing the outer circumferential edge 14a of the second disc half 14 in abutment on the outer circumferential edge 3b of the first disc half 3.

As best shown in FIG. 1, the auxiliary support 11 also includes an auxiliary holding assembly 16 retaining the second disc half 14, once the second disc half 14 has been released under the auxiliary support 11 by the above-mentioned mechanical handling device. The auxiliary holding assembly 16 may be of a mechanical type or, as provided in the described embodiment, may include the use of one or more auxiliary suction cups 16a to be actuated through respective suction ducts 17 connected with a suction pump (not shown).

Figure 3:
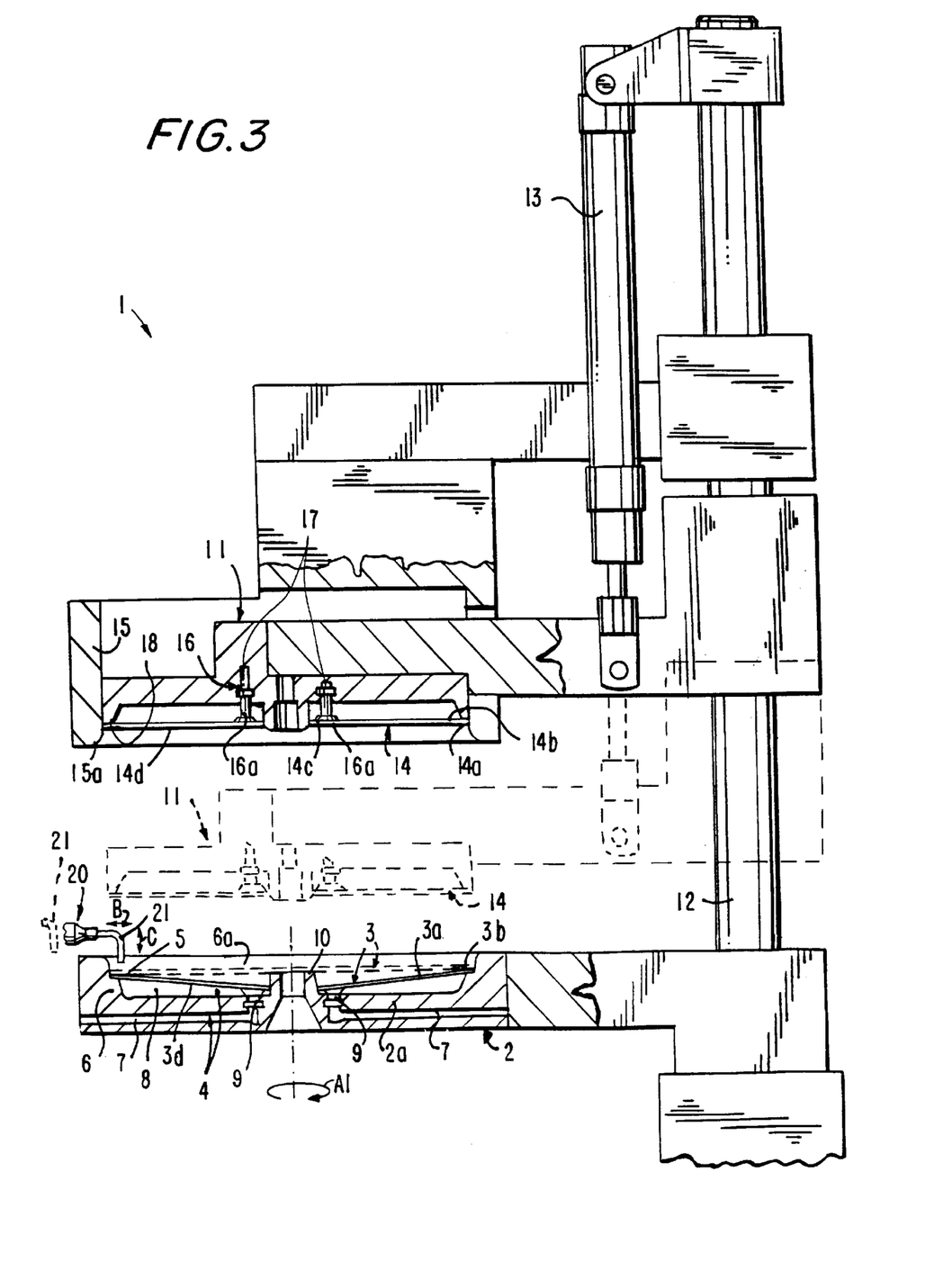
FIG. 3 is yet another preferred embodiment of an apparatus for gluing disc halves together during manufacture of data-storage optical discs in accordance with the teachings of the present invention.

In the embodiment shown in FIG. 3, the auxiliary suction cups 16a hold the second disc half 14, retaining the second disc half 14 in a rest condition, that is, in a substantially planar configuration wherein its circumferential edge 14a abuts against an auxiliary rest portion 18 provided on the auxiliary support 11.

In contrast, in the embodiments shown in FIGS. 1 and 2, the auxiliary suction cups 16a take a slightly raised position relative to the lying plane of the auxiliary rest portion 18, so that, together with the rest portion 18, the auxiliary suction cups 16a define auxiliary deformation members similar in structure and operation to the elastic-deformation members described with reference to the main support 2. In practice, the suction ducts 17 in the embodiments in FIGS. 1 and 2 open through the respective auxiliary suction cups 16a into an auxiliary vacuum chamber 19 defined between the auxiliary support 11 and an upper surface 14b of the second disc half 14.

The vacuum produced in the auxiliary chamber 19 causes deformation of the second disc half 14 from its rest condition to a respective elastic-deformation condition, wherein the second disc half is deformed into a substantially conical configuration, with a central portion thereof being raised relative to its outer circumferential edge 14a. When the second disc half 14 reaches its resiliently deformed condition, the central portion 14c of the second disc half 14 is brought into abutment relation with one or more auxiliary inner rest elements that may, for example, be in the form of the same auxiliary suction cups 16a. In any event, the auxiliary suction cups 16a also perform the function of holding the second disc half 14 in its resiliently deformed condition.

The apparatus for gluing disc halves 1 of the present invention also includes an adhesive dispensing assembly generally referred to by reference numeral 20, adapted to distribute an adhesive or glue between the first and second disc halves 3, 14 so as to enable stable pairing of the first and second disc halves 3, 14.

In accordance with the preferred embodiment shown in FIG. 1, the adhesive dispensing assembly 20 includes a delivery nozzle 21 operating at the central portion of the first disc half 3, having its dispensing end extending in the direction of the parametric edge 3b of the latter. An actuating member 21a, formed of an electric motor, for example, drives nozzle 21 in rotation about the first disc half 3 axis, as shown by arrow A, to evenly spread the adhesive along the outer circumferential edge 3b of the first disc half.

In particular, nozzle 21 preferably operates through a opening 22 concentrically formed through the base wall 2a of the main support 2. However, the delivery nozzle 21 and respective actuating member 21a may be in engagement with the auxiliary support 11 as well, in the same manner as above described.

Figure 2:
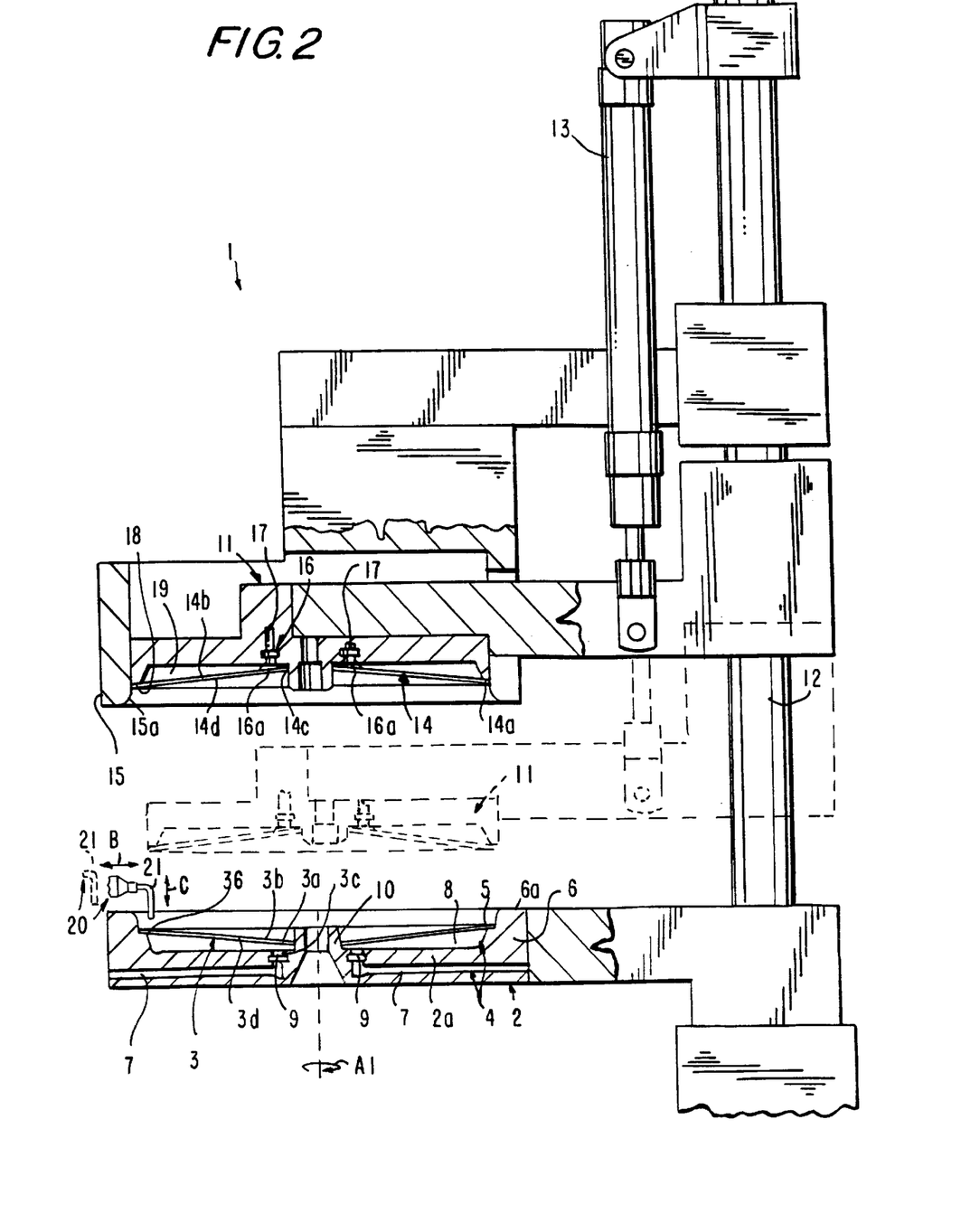
FIG. 2 is another preferred embodiment of an apparatus for gluing disc halves together during manufacture of data-storage optical discs in accordance with the teachings of the present invention.

In another preferred embodiment, the electric motor or equivalent actuating member can drive the main support 2 in rotation about its own axis, coincident with the geometric axis of the first disc half 3, as shown by arrow A1 in FIGS. 2 and 3. The delivery nozzle 21 is movable, as shown by arrow B, between a rest position, wherein the delivery nozzle 21 is moved away from the main support 2 and the first disc half 3, beyond the radial overall dimensions of same, and an operating position, wherein the delivery nozzle 21 operates close to the outer circumferential edge 3b of the first disc half 3 to evenly distribute the adhesive while the support 2, and as a result the disc half, are being rotated.

In order to achieve an even distribution of the adhesive, at least one complete turn of the first disc half 3 is required. As shown by arrow C in FIGS. 2 and 3, nozzle 21 can be moved in a vertical direction to cause the end of said nozzle to be brought close to the parametric edge 3b extending over the parametric projection 6a without interfering therewith.

In both embodiments of the adhesive dispensing assembly 20, the dispensed adhesive delivered along the circumferential edge 3b of the first disc half 3 preferably has a low viscosity, comparable to that of water. Consequently, due to the invertedcone configuration of the first disc half 3 when disposed in its resiliently deformed condition, the adhesive distributed in a predetermined amount along the outer circumferential edge 3b tends to spread by gravity, thereby being evenly distributed over the entire surface 3a intended for gluing. If required, in the embodiment shown in FIGS. 2 and 3, the delivery nozzle 21 can be actuated above the first disc half 3 even in the direction of the geometric axis of the latter, to facilitate an even glue spreading.

The operating cycle of the apparatus for gluing disc halves together will now be described in connection with each of the embodiments shown in FIGS. 1, 2 and 3, respectively.

Referring to the FIG. 1 embodiment, the first disc 3 is arranged on the main support 2 in such a manner that its surface intended for gluing 3a is turned upwardly. The suction action produced in the vacuum chamber 8 causes the elastic deformation of the first disc half 3 from its rest condition, wherein the first disc half is in a substantially planar configuration, to its resiliently deformed condition, wherein the central portion 3c of the disc half is engaged by the suction cups 9. Concurrently with positioning arrangement of the first disc half 3 on the main support 2, the second disc half 14 is also engaged under the auxiliary support 11.

AS a result of the vacuum produced in the auxiliary vacuum chamber 19, the second disc half 14 is brought to its respective elastic deformation condition wherein the second disc half 14 is deformed in a substantially conical configuration, in mirror image relationship with the first disc half 3.

Then, the auxiliary support 11 is lowered onto the main support 2 so that the outer circumferential edge 14a of the second disc half 14 is brought into contact with the outer circumferential edge 3b of the first disc half 3, as shown in broken line of FIG. 1.

At this time, the delivery nozzle 21 is activated and thereby delivers glue at least at the outer circumferential edge 3b of the first disc half 3. Simultaneously with glue delivery, nozzle 21 is set in rotation by the actuating member 21a so that glue is distributed along the entire extension of the circumferential edge of the disc half 3. Since the circumferential edge 3b of the first disc half 3 is in contact with the circumferential edge 14a of the second disc half 14, any risks of glue escaping from the parametric edges of the disc halves is advantageously eliminated. As previously described, the delivered glue on the periphery of the disc half 3 immediately runs down by gravity towards the central portion 3a of the disc half itself, and evenly spreads over the entire surface to be glued 3a.

Thereafter, the first and second disc halves 3, 14 are released simultaneously or one after the other from their elastic deformation condition by deactivation of the suction produced through the respective suction ducts 7, 17. Then, the disc halves 3, 14 resiliently resume their respective rest conditions and consequently mate with each other, since the lower surface 14d of the second disc half 14 comes into contact with the gluing surface 3a of the first disc half 3 which is coated with glue. The optical disc thus obtained can thereby be removed from the apparatus 1 after moving the auxiliary support 11 away from the main support 2.

Referring now to the embodiment of FIG. 2, the operating cycle of the embodiment shown therein shown involves engagement of the first and second disc halves 3, 14 on the main support 2 and auxiliary support 11 respectively, in the same manner as above described with reference to the embodiment of FIG. 1. Before the respective parametric edges 3b, 14a of the disc halves 3, 14 are brought into mutual contact following movement of the auxiliary support 11 close to the main support 2, glue is spread on the first disc half 3. To accomplish the proper gluing in this embodiment, the delivery nozzle 21 is moved to its operating position, close to the outer circumferential edge 3b of the first disc half 3. The main support 2 is rotated in the direction of arrow Al together with the first disc half 3, while the delivery nozzle 21 is delivering glue which is therefore spread on the entire extension of the outer circumferential edge 3b of said disc half. The delivery nozzle 21 is then moved from its operating position to its rest position to enable the second disc half 14 to move close to the first disc half 3.

Once the two disc halves 3, 14 have come into mutual contact relationship at their respective parametric edges, the disc halves 3, 14 are released from their elastically deformed condition to be matingly paired together in the same manner as described with reference to the embodiment of FIG. 1.

With reference to the embodiment of FIG. 3, the arrangement of the first disc half 3 on the main support 2 and elastic deformation thereof occur in the same manner as previously described. The second disc half 14 is positioned on the auxiliary support 11 and retained thereon by the holding assembly 16 maintaining a planar configuration. Upon actuation of the dispensing member 20, glue is spread on the first disc half 3 in the same manner as described with reference to the embodiment of FIG. 2.

When the glue delivered to the outer circumferential edge 3b has been evenly distributed on the gluing surface 3a, the first disc half 3 is released from its deformed condition to a rest condition, achieving a planar configuration again, and after displacement of the delivery nozzle 21 to its rest position, the auxiliary support 11 is lowered onto the main support 2. As a result, the disc halves 3, 14, both disposed in a rest condition and having therefore a planar configuration, mate with each other by direct mutual contact of the entire surface extension of their opposite surfaces 3a, 14d.

The operating cycle relative to the preferred embodiments described terminate with an optional pressing of the two disc halves 3, 14 followed by a drying step applied to any separation remaining between the two disc halves.

The apparatus of the present invention is therefore capable of performing mating of the disc halves in an optimal manner, by ensuring an even glue distribution on the surfaces in mutual contact and eliminating any risks of glue escaping from the outer parametric edge of the obtained disc. Thus, any additional cleaning and/or grinding operation is no longer required for eliminating any excess glue extending from the outer parametric edges of the discs. In addition, the apparatus of the present invention is very simple in terms of achieving its intended goal and operation, which in turn leads to advantages in the manufacturing and servicing costs of same.

Due to its compact structure, the apparatus in question can be easily installed on conventional machines for automatic production of optical discs.

In addition, the great flexibility of use of the apparatus enable it to be effectively employed for making different kinds of optical discs of the type currently called "DVD".

While the present invention has been particularly shown and described with reference to certain preferred embodiments, it will be readily apparent to those of ordinary skill in the art that various changes and modifications may be made therein without departing from the spirit and scope of the invention. It is intended that the appended claims be interpreted as including the foregoing as well as various other such changes and modifications.

What is claimed is:

1. An apparatus for gluing disc halves together in the manufacture of data-storage optical discs, comprising:
   a main support arranged to receive a first disc half thereon, said first disk half having a surface intended for gluing turned upwardly facing away from said main support;
   an auxiliary support movable relative to said main support between a rest position, wherein said auxiliary support is moved away from the main support to receive and retain a second disc half, and a work position, wherein said auxiliary support operates on said main support to align the second disc half with the first disc half;
   means for dispensing an adhesive between said first and second disc halves; and
   means for elastically deforming said first disc half to dispose said first disc half in a deformed condition wherein an outer circumferential edge of said first disc half is raised relative to its central portion, said adhesive dispensing means distributing adhesive at least close to the outer circumferential edge of said first disc half in its deformed condition permitting the glue to spread by gravity along a surface of said first disc half intended for gluing.

2. The apparatus for gluing disc halves together of claim 1, wherein said elastic deformation means comprises a rest portion located on a side wall of the main support and acting at the outer circumferential edge of the first disc half, and holding means for deforming said first disc half from a rest condition, wherein said first disc half is substantially planar, to said deformed condition.

3. The apparatus for gluing disc halves together of claim 2, wherein said holding means comprises at least one suction duct opening into a vacuum chamber defined between said main support and a lower surface of said first disc half with the outer circumferential edge of said first disc half being disposed on said rest portion.

4. The apparatus for gluing disc halves together of claim 2, wherein said holding means comprises a predetermined number of suction cups operating at a lower surface of the first disc half to retain said first disc half in its deformed condition.

5. The apparatus for gluing disc halves together of claim 2, wherein said holding means further comprises at least one inner rest element on which the central portion of the first disc half contacts when said first disc half is in its deformed condition.

6. The apparatus for gluing disc halves together of claim 1, wherein said adhesive dispensing means comprises:
   a delivery nozzle capable of being placed close to said central portion of said first disc half to thereby deliver the adhesive to said outer edge of said first disc half; and
   nozzle actuating means for driving said nozzle in rotation about the axis of said first disc half to distribute glue on the outer circumferential edge of said first disc half.

7. The apparatus for gluing disc halves together of claim 1, wherein said adhesive dispensing means comprises:
   actuating means operating on the main support for rotating said first disc half about its own axis;
   a delivery nozzle movable between a rest position, wherein said delivery nozzle is spaced away from said main support, and an operating position, wherein said delivery nozzle operates close to said outer circumferential edge of the first disc half to distribute glue during a full turn of said first disc half.

8. The apparatus for gluing disc halves together of claim 1, and further including auxiliary holding means mounted on auxiliary support to retain the second disc half in engagement with said auxiliary support beneath said auxiliary support.

9. The apparatus for gluing disc halves together of claim 8, wherein said auxiliary holding means comprises a predetermined number of suction cups operating on an upper surface of said second disc half.

10. The apparatus for gluing disc halves together of claim 9, wherein said auxiliary holding means further comprises at least one auxiliary rest portion located on said auxiliary support and acting in abutting relationship with an outer circumferential edge of said second disc half.

11. The apparatus for gluing disc halves together of claim 8 wherein said auxiliary holding means deforms said second disc half between a rest condition, wherein said second disc half is substantially planar, and a deformed condition, wherein a central portion of said second disc half is raised relative to an outer circumferential edge thereof.

12. The apparatus for gluing disc halves together of claim 11, wherein said auxiliary holding means comprises at least one auxiliary suction duct opening into an auxiliary suction chamber defined between said auxiliary support and an upper surface of the second disc half with an outer circumferential edge of said second disc half being placed against an, auxiliary rest portion formed in the auxiliary support.

13. The apparatus for gluing disc halves together of claim 11, wherein said auxiliary holding means further comprises an auxiliary inner rest element on which the central portion of the second disc half contacts when the second disc half is in its said deformed condition.

14. The apparatus for gluing disc halves together of claim 1, and further comprising a fixed outer jacket surrounding said auxiliary support in its said rest position and defining at least one parametric projection having a shape configuration which substantially matches that of said second disc half to thereby promote placement of said second disc half to a centered position relative to the auxiliary support.

15. The apparatus for gluing disc halves together of claim 1, wherein said main support has at least one parametric projection the shape of which substantially matches that of said first disc half to promote placement of said first disc half to a centered position on said main support.

16. The apparatus for gluing disc halves together of claim 1, wherein said auxiliary support is located over said main support and is movable in a vertical direction to said work position to bring said outer circumferential edge of said second disc half in abutment against said outer circumferential edge of the first disc half.

17. The apparatus for gluing disc halves together of claim 1 wherein said elastic deformation means is associated with said main support.

18. A process for gluing disc halves together in the manufacture of data-storage optical discs comprising the following steps:
   positioning a first disc half so that one of its surfaces intended for gluing is turned upwardly;
   resiliently deforming said first disc half bringing an outer circumferential edge thereof to a raised position relative to a central portion of said first disc half;
   spreading an adhesive at least on the outer circumferential edge of said first disc half and permitting the adhesive to spread by gravity along the surface of said first disc half intended for gluing; and pairing the first disc half with a second disc half by moving one lower face of the second disc half into contact with the surface intended for gluing of the first disc half.

19. The gluing process of claim 18, wherein before spreading of an adhesive, the following steps are carried out:

resiliently deforming the second disc half by a central portion thereof to a raised position relative to an outer circumferential edge of the second disc half; and positioning the outer circumferential edge of the second disc half into contact with the outer circumferential edge of the first disc half, and releasing said first and second disc halves from a deformed condition, so that said disc halves are in an aligned, planar configuration for mutual contact between said gluing surface of said first disc half and said lower surface of said second disc half.

20. The gluing process according to claim 19, wherein said adhesive spreading step occurs after said outer circumferential edges of said disc halves have been brought into said mutual contact relationship.

21. The gluing process according to claim 20 and further comprising the steps of:

delivering adhesive from a delivery nozzle located at a central portion relative to said first and second disc halves; and rotating said nozzle about the axis of said first and second disc halves.

22. The gluing process according to claim 18, wherein adhesive spreading comprises the further steps of:

positioning a delivery nozzle to an operating position close to the outer circumferential edge of the first disc half;

turning said first disc half one complete revolution while adhesive is being delivered from said nozzle so as to spread the adhesive along said outer circumferential edge; and moving said delivery nozzle from an operating position to a rest position wherein said delivery nozzle is laterally spaced apart from the first disc half.

23. The gluing process according to claim 22, wherein before the step of pairing the two disc halves together, said first disc half is released from its said resiliently deformed condition to achieve a substantially planar configuration with said second disc half being held in its said substantially planar configuration during the pairing step.

* * * * *